United States Patent
Pautis et al.

(10) Patent No.: US 9,868,543 B2
(45) Date of Patent: Jan. 16, 2018

(54) ASSEMBLY FOR AN AIRCRAFT COMPRISING AN ATTACHMENT PYLON PRIMARY STRUCTURE FORMED WITH THREE INDEPENDENT ELEMENTS

(71) Applicant: Airbus Operations (S.A.S.), Toulouse (FR)

(72) Inventors: Olivier Pautis, Merville (FR); Jonathan Blanc, Blagnac (FR)

(73) Assignee: Airbus Operations (S.A.S.), Toulouse (FR)

( * ) Notice: Subject to any disclaimer, the term of this patent is extended or adjusted under 35 U.S.C. 154(b) by 203 days.

(21) Appl. No.: 14/693,545

(22) Filed: Apr. 22, 2015

(65) Prior Publication Data

US 2015/0307199 A1 Oct. 29, 2015
US 2016/0130009 A9 May 12, 2016

(30) Foreign Application Priority Data

Apr. 23, 2014 (FR) ...................................... 14 53628

(51) Int. Cl.
*B64D 27/00* (2006.01)
*B64D 29/02* (2006.01)
*B64D 27/26* (2006.01)

(52) U.S. Cl.
CPC .............. *B64D 29/02* (2013.01); *B64D 27/26* (2013.01); *B64D 2027/268* (2013.01)

(58) Field of Classification Search
CPC .............. B64D 27/26; B64D 2027/266; B64D 2027/262; B64D 29/06; B64D 29/00;
(Continued)

(56) References Cited

U.S. PATENT DOCUMENTS 4,637,573 A * 1/1987 Perin ...................... B64D 29/02
                                                              244/130
6,173,919 B1 * 1/2001 Le Blaye ............... B64D 27/26
                                                              244/54

(Continued)

FOREIGN PATENT DOCUMENTS

EP    1 090 838    4/2001
EP    2 062 819    5/2009

(Continued)

OTHER PUBLICATIONS

French Search Report for Application No. 14 53 628 dated Dec. 9, 2014.

*Primary Examiner* — Assres H Woldemaryam
(74) *Attorney, Agent, or Firm* — Jenkins, Wilson, Taylor & Hunt, P.A.

(57) ABSTRACT

In order to optimize the bulkiness of a primary structure of an aircraft engine attachment pylon and thus make it easier to install under the wing and as close as possible to the pressure face thereof, the disclosure herein provides an assembly in which the engine comprises a rear part arranged under a wing element equipped with a wing box, the primary structure being made up of the following independent elements: a first and a second side beam arranged one on each side of a vertical mid-plane of the engine; and an intermediate structure through which the vertical mid-plane of the engine passes and which is situated some distance from each of the first and second side beams.

10 Claims, 4 Drawing Sheets

(58) Field of Classification Search
CPC ........ B64D 27/10; B64D 27/12; B64D 27/16; B64D 29/02
See application file for complete search history.

(56) References Cited

U.S. PATENT DOCUMENTS

| | | | | |
|---|---|---|---|---|
| 6,341,746 | B1 * | 1/2002 | Pascal | B64D 27/26 244/54 |
| 6,474,596 | B1 * | 11/2002 | Cousin | B64D 27/26 244/131 |
| 7,264,206 | B2 * | 9/2007 | Wheaton | B64C 7/02 244/210 |
| 7,526,921 | B2 * | 5/2009 | Williams | B64D 41/00 244/54 |
| 8,141,817 | B2 * | 3/2012 | Baillard | B64D 27/26 244/53 R |
| 8,640,987 | B2 | 2/2014 | Journade et al. | |
| 8,740,139 | B1 * | 6/2014 | Dunavan | B64C 3/10 244/54 |
| 9,211,955 | B1 * | 12/2015 | Mauldin | B64D 27/26 |
| 2010/0181418 | A1 * | 7/2010 | Vauchel | B64D 27/18 244/54 |
| 2012/0175462 | A1 * | 7/2012 | Journade | B64D 27/18 244/54 |
| 2013/0233997 | A1 * | 9/2013 | Suciu | B64D 27/26 248/554 |

FOREIGN PATENT DOCUMENTS

| | | | | |
|---|---|---|---|---|
| FR | EP 1481897 A1 * | 12/2004 | ............ | B64D 27/26 |
| FR | 2891255 A1 * | 3/2007 | ............ | B64D 27/26 |
| FR | 2 917 710 | 12/2008 | | |
| FR | 2 950 323 | 3/2011 | | |
| FR | 2956883 A1 * | 9/2011 | ........... | F04D 29/526 |
| FR | 2 993 535 | 1/2014 | | |

* cited by examiner

ASSEMBLY FOR AN AIRCRAFT COMPRISING AN ATTACHMENT PYLON PRIMARY STRUCTURE FORMED WITH THREE INDEPENDENT ELEMENTS

CROSS-REFERENCE TO RELATED APPLICATION

This application claims priority to FR 14 53628 filed Apr. 23, 2014, the entire disclosure of which is incorporated by reference herein.

TECHNICAL FIELD

The present disclosure relates to the field of aircraft assemblies comprising a wing element, a bypass engine and a pylon for the attachment of the engine, the latter being intended to be arranged in part under the wing element.

The disclosure herein also relates to an aircraft equipped with such an assembly. It is preferably applied to commercial airplanes.

BACKGROUND

In existing aircraft, bypass engines such as turbojet engines are suspended beneath the wing by complex attachment devices also referred to as EMS (Engine Mounting Structures) or attachment pylons. The attachment devices usually employed have a primary structure, also referred to as a rigid structure, often produced in the form of a single box, namely one made up of the assembly of upper and lower spars joined together by a plurality of transverse ribs situated inside the box. The spars are arranged on the upper and lower faces, while side panels close the box on the lateral faces. In addition, the attachment pylon is arranged in the upper part of the engine, between the latter and the wing box. This position is referred to as the "12 o'clock" position.

As is known, the primary structure of these pylons is designed to allow the static and dynamic loads generated by the engines, such as the weight, the thrust or even the various dynamic loads, notably those associated with cases of failure such as: loss of blades (FBO), collapse of the front landing gear, hard landing, etc. to be transmitted to the wing.

In known attachment pylons of the prior art, the transmission of loads between its primary structure, known in the form of a single box, and the wing, is performed in the conventional way by a set of mounts comprising a front mount, a rear mount, and an intermediate mount notably intended to react thrust loads generated by the engine.

In order to achieve this, the intermediate mount is intended to react thrust loads and is also referred to as a "spigot" mount and is generally embodied by a ball fixed in the rear upper spar of the rigid-structure box between the front mount and the rear mount. This spigot mount also comprises a shear pin or peg fixed under the wing of the aircraft by an insetting fitting, so as to be able to be housed in the ball. The insetting fitting is generally fixed to a lower part of the wing box, usually the lower spar of the wing box.

In recent bypass engines, the high bypass ratio desired has led to an extremely high bulkiness because an increase in the bypass ratio unavoidably leads to an increase in the diameter of the engine and, more particularly, to an increase in the diameter of the fan casing thereof.

Thus, with a ground clearance which is fixed so that it remains acceptable from a safety standpoint, the space left available between the wing element and the engine becomes increasingly small, or even non-existent in the case of engines with a high bypass ratio. As a result, it may prove difficult to install the attachment pylon and the various wing mounts in this remaining vertical space usually devoted to such installation.

The way in which bypass engines have evolved has therefore had the detrimental effect of imposing a reduction on the vertical dimensions of the attachment pylon, notably so as to be able to maintain sufficient space for installing the front and rear mount fittings and the intermediate mount inset fitting. The large dimensions of this intermediate fitting are necessitated by the need to react the engine thrust loads, namely loads oriented in the longitudinal direction of this engine, and those oriented in the transverse direction thereof. By way of indication, it is recalled that the longitudinal direction of the engine corresponds to the direction of the main axis of rotation of the propulsion system.

However, the options for reducing the vertical dimensions of the attachment pylon are limited. Specifically, the rigid structure of this pylon, also referred to as primary structure, needs to have sufficient dimensions that it is able to afford mechanical strength capable of withstanding the transmission of load from the engine toward the wing element, with small deformation under stress with a view to not impairing the aerodynamic performance of the propulsion system.

In the prior art, multiple solutions have been proposed for bringing the engine as close as possible to the wing element from which it is suspended, this being with a view to maintaining the ground clearance required, notably with regard to the risks of ingestion and collision, also known as the FOD (Foreign Object Damage) risk. Nevertheless, these solutions need constantly to be improved upon in order to adapt to suit the increasingly high diameters of fan casing adopted in order to meet bypass ratio requirements.

By way of indicative example, document FR 2 993 535 discloses an attachment pylon, the primary structure of which is produced from two diametrically opposed side beams arranged one on each side of a vertical mid-plane of the engine. The primary structure is supplemented by a connecting structure which directly joins the two beams together, these incidentally each being fixed at their front ends to the engine casing and at their rear ends to the wing box. The intermediate structure adopts the form of several bows connecting the two beams, passing along an imaginary surface of circular cross section corresponding substantially to the surface externally delineating the bypass flow path, also referred to as the "internal nacelle". These bows therefore extend over angular sectors of the order of 180°.

The arrangement proposed in this document FR 2 993 535 notably makes it possible to limit aerodynamic disturbances within the bypass flow path. Furthermore, by positioning the beams laterally it is possible to bring the engine as close as possible to the wing element, particularly by comparison with the conventional solutions in which the box-shaped primary structure is arranged in the 12 o'clock position.

Nevertheless, such a primary structure has a high overall bulkiness particularly because of the presence of the bows that connect the side beams. This bulkiness may make installing surrounding elements such as the nacelle, the engine auxiliary systems, the thrust reversers, the mobile leading edge flaps, etc. more difficult. As a result, there remains a need to optimize the bulkiness of such primary structures of the attachment pylon.

SUMMARY

It is therefore an object of the disclosure herein to propose an assembly for an aircraft that at least partially overcomes the problems mentioned hereinabove that are encountered in the solutions of the prior art.

In order to achieve that, one subject of the disclosure herein is an assembly for an aircraft comprising a wing element, a bypass engine and an engine attachment pylon, the engine comprising a rear part arranged under the wing element equipped with a wing box, the pylon comprising a primary structure for transmitting loads from the engine to the wing box, and the assembly further comprising attachment structure for attaching the primary structure to the engine and attachment structure for attaching the primary structure to the wing box. According to the disclosure herein, the primary structure is made up of the following independent elements:
- a first and a second side beam which are arranged one on each side of a vertical mid-plane of the engine, preferably located substantially symmetrically with respect to the vertical mid-plane; and
- an intermediate structure through which the vertical mid-plane of the engine passes and which is situated some distance from each of the first and second side beams, preferably at an equal distance from both beams.

The disclosure herein breaks with present-day technology by providing a primary structure produced as several elements independent of one another. That makes it possible to reduce the overall bulk of the primary structure, particularly in so far as it no longer has intermediate structures connecting the two side beams. Installing the surrounding elements becomes easier using the design specific to the disclosure herein. By way of example, the nacelle and its thrust reverser system can sit as close as possible to the engine casing because it is not impeded by the presence of the bows connecting the two side beams, as it was in document FR 2 993 535. Furthermore, systems can more easily be integrated into the pylon, between the two side beams of the primary structure. Still by way of example, the absence of the connecting bows allows mobile leading-edge flaps to be installed between the two side beams. That is in contrast with the solution of document FR 2 993 535 in which the presence of the connecting bows meant that the parts of the leading edge situated facing these bows had to be kept fixed.

For preference, the disclosure herein also comprises at least one of the following optional technical features considered in isolation or in combination.

The attachment structure for attaching the primary structure to the engine comprises:
- one or more first engine mounts connecting a front end of the first beam to a fan casing of the engine;
- one or more second engine mounts connecting a front end of the second beam to the fan casing; and
- one or more third engine mounts connecting the intermediate structure to a central casing of the engine, preferably in the rear zone thereof, and the attachment structure for attaching the primary structure to the wing box comprises:
- one or more first wing mounts connecting a rear end of the first beam to the wing box;
- one or more second wing mounts connecting a rear end of the second beam to the wing box; and
- one or more third wing mounts connecting the intermediate structure to the wing box.

Additional provisions are that:
the first wing mount or mounts constitute an independent load-reacting statically determinate system;
the second wing mount or mounts constitute a load-reacting independent statically determinate system;
the third wing mount or mounts constitute a load-reacting independent statically determinate system; and
the first engine mount or mounts, the second engine mount or mounts and the third engine mount or mounts together constitute a load-reacting statically determinate system.

The first and second side beams are arranged substantially symmetrically with respect to the vertical mid-plane, having, passing through them, a plane substantially perpendicular to this same vertical mid-plane and passing diametrically through the engine, the first and second side beams being substantially aligned with an external surface of the fan casing in the longitudinal direction of the engine.

The intermediate structure has a length, in the longitudinal direction of the engine, between three and ten times smaller than that of each of the first and second side beams.

The intermediate structure takes the form of a fitting, preferably in the overall shape of a pyramid. Alternatively, it could be some other type of shape, for example a link rod.

The third engine mount or mounts are connected to a turbine casing of the engine.

The first and second side beams run substantially parallel to a longitudinal axis of the engine.

The wing element comprises at least one mobile leading-edge flap arranged at least in part, when viewed from above, between the intermediate structure and one of the first and second side beams.

Finally, another subject of the disclosure herein is an aircraft comprising at least one assembly like the one that has just been described.

Further advantages and features of the disclosure herein will become apparent from the nonlimiting detailed description below.

BRIEF DESCRIPTION OF THE DRAWINGS

This description is given with reference to the attached drawings among which.

DETAILED DESCRIPTION

Figure 1:
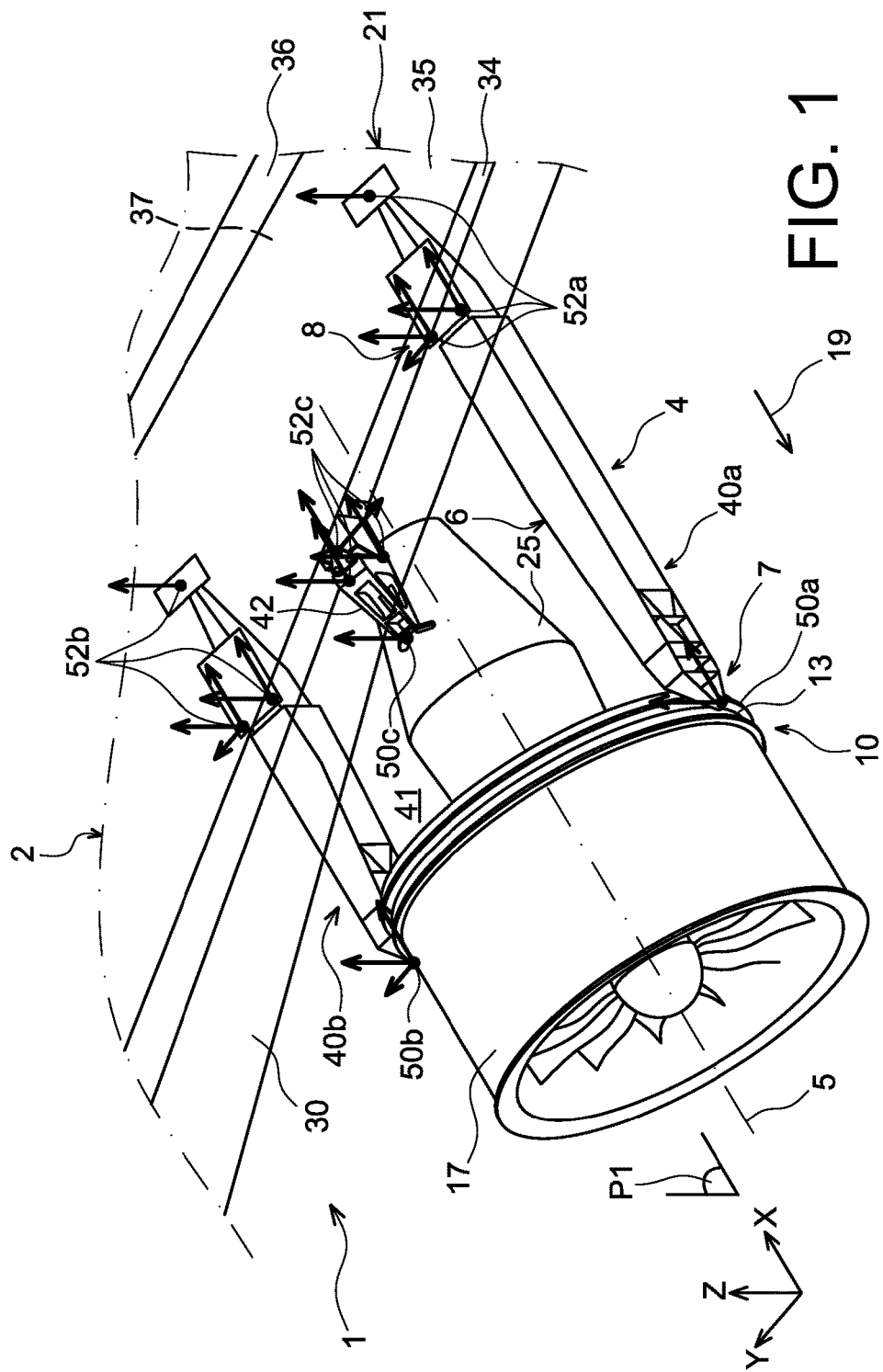
FIG. 1 depicts a schematic perspective view of an assembly for an aircraft according to a first preferred embodiment of the present disclosure.

Reference is made to FIGS. 1 to 4 which depict an assembly 1 for an aircraft, according to a first preferred embodiment of the present disclosure.

Overall, this assembly 1 comprises a wing element 2 corresponding to a wing of the aircraft, a bypass engine 10 such as a turbojet engine, and an attachment pylon 4 for attaching the engine 10. In addition, the assembly 1 comprises attachment structure 7 for attaching the turbojet engine 10 to a primary structure 6 of the pylon 4, and attachment structure 8 for attaching the primary structure 6 to the wing element 2.

Throughout the description which follows and by convention, the direction X corresponds to the longitudinal direction of the pylon 4, which can also be likened to the longitudinal direction of the turbojet engine 10. This direction X is parallel to a longitudinal axis 5 of this turbojet engine 10. On the other hand, the direction Y corresponds to the direction oriented transversely to the pylon 4 and also likenable to the transverse direction of the turbojet engine 10, whereas the direction Z corresponds to the vertical or heightwise direction. These three directions X, Y and Z being orthogonal to one another and form a direct trihedron.

Furthermore, the terms "front" and "rear" are to be considered with reference to a direction of travel of the aircraft which direction is encountered as a result of the thrust exerted by the turbojet engines 10, this direction being depicted schematically by the arrow 19.

The wing 2 comprises a wing box 21, intended to constitute the structural part of the wing. This box is delimited at the front by a front spar 34 of the wing element 2 and delimited at the rear by a rear spar 36. The two spars 34, 36, which extend substantially through the full thickness of the wing, are oriented in the conventional way in the direction of the span. Furthermore, the wing box 21 is closed at the top by the suction face part 35 of the wing and is closed at the bottom by the pressure face part 37 of this same wing. The two spars 34, 36 are fixed internally to the suction-face and pressure-face parts 35, 37 which form the aerodynamic surfaces of the wing.

The figures depict only the primary structure 6 of the attachment pylon 4, accompanied by the aforementioned attachment structure 7, 8. The other constituent components of this pylon 4 which have not been depicted, of the type of secondary structure that segregates and holds systems while at the same time supporting the aerodynamic fairings are conventional elements identical or similar to those encountered in the prior art. In consequence, no detailed description thereof will be given.

The primary structure 6, or rigid structure, allows the static and dynamic loadings generated by the turbojet engine 10 to be transmitted to the wing box 21. It offers a design specific to the disclosure herein in so far as it is made up of three elements which are distinct from and independent of one another. What is meant by being independent of one another is that the elements concerned are not mechanically connected to one another except of course indirectly at their front and rear ends by the engine casing and the wing box 21 respectively.

First of all, there is a first side beam 40a and a second side beam 40b which are arranged one on each side of a vertical mid-plane P1 of the engine, passing through the axis 5. These beams 40a, 40b are preferably arranged substantially diametrically opposite on or near a horizontal mid-plane of the engine 10, as shown in the nonlimiting example of FIG. 2. So, the two beams 40a, 40b are positioned in what is referred to as the 3 o'clock and 9 o'clock positions, or in positions close to these. They also run substantially parallel to the axis 5, from the rear end of a fan casing 17 towards the wing box 21.

In other words, the side beams 40a, 40b are arranged substantially symmetrically with respect to the vertical midplane P1, having passing through them a horizontal plane that passes diametrically through the engine 10. In addition, these side beams 40a, 40b are substantially aligned with an external surface of the fan casing 17, in the longitudinal direction of the engine, namely in the direction of the axis 5.

These beams 40a, 40b run under the pressure-face part 37, as close as possible thereto, just like a rear part of the turbojet engine 10, particularly all or part of the turbine casing 25 and of the elements situated to the rear of this casing. More generally, this is part of the engine casing that is situated downstream of the fan casing 17 and referred to as the "core" casing or central casing of the turbojet engine. By bringing the turbojet engine 10 closer to the pressure-face part 37 it is possible to contemplate turbojet engine designs with high bypass ratios and therefore large fan diameters, while at the same time maintaining the required ground clearance.

Each of the beams 40a, 40b also has a design similar to that of conventional primary structures arranged in the 12 o'clock position. In other words, each side beam is of the "box" type, namely is formed of the assembly of an upper and lower spar and of two side panels, these elements being joined together by internal transverse ribs (not depicted) which are usually oriented in parallel YZ planes. These ribs are preferably uniformly distributed through the box, along the X direction.

The beams 40a, 40b may be made of metal, or alternatively made of composite material because they are not greatly exposed to thermal stresses of the stream of hot air passing along the secondary flow path 41, which these beams do not enter.

The third element that makes up the primary structure 6 of the attachment pylon is a smaller-sized intermediate structure 42, in this instance shaped as a pyramid. This intermediate structure 42 is centred with respect to the side beams 40a, 40b and has the mid-plane P1 passing through it. It is therefore independent of these beams, namely is not mechanically connected thereto and is arranged some distance therefrom. The three elements 40a, 40b, 42 thus constitute three distinct and independent paths for load between the engine and the wing box.

The intermediate structure 42 in this instance takes the form of a fitting, preferably made of metal, which extends in part into the leading edge 30 of the wing 2, in line with the front spar 34 of the wing box 21. The fitting 42 also extends parallel to the axis 5, forwards beyond the leading edge, but over a short distance. More specifically, this fitting 42 has a length, in the direction of the axis 5, that is between three and ten times smaller than that of each side beam 40a, 40b. Specifically, as will be detailed hereinafter, this fitting 42 is intended to be connected to the turbine casing 25 and not to or in the vicinity of the fan casing 17, as is the case of the beams 40a, 40b. Because a front part of this fitting 42, in its region of attachment to the turbine casing 25, is included within the secondary flow path 40 of the engine, it needs to be shrouded by an appropriate aerodynamic fairing (not depicted) so as not to impair the overall aerodynamic performance of the engine. As this shrouding is deemed to be conventional practice, it will not be described further.

The three independent elements 40a, 40b, 42 that make up the primary structure 6 leave between them spaces in which systems customarily present in this type of assembly 1 can be installed. By way of example, these may be engine return/control systems, electric generation/regulation systems and aerothermal systems, or alternatively may be safety systems. Furthermore, because of the lack of mechanical connection between these independent elements 40a, 40b, 42, the engine nacelle can be sited as close as possible to the central casing without problems of bulkiness. Moreover, only the intermediate structure 42, which can be likened to a discrete spot element, passes through the secondary flow path 40. The overall aerodynamic performance of the assembly 1 is therefore higher.

It is also noted that the space available between the beams 40a, 40b and the intermediate structure 42 allows mobile leading edge flaps to be installed at this point. As has been depicted in the plan view of FIG. 4, the disclosure herein advantageously makes it possible to install a mobile leading edge flap 44 between the intermediate structure 42 and each side beam 40a, 40b. This is because the spaces situated in front of these mobile flaps 44 which have been depicted in FIG. 4 in their retracted position can be left free in order to allow them to deploy forwards, without problems of mechanical interaction. The addition of such mobile flaps at this point along the leading edge 30, by comparison with the solutions of the prior art in which these flaps necessarily had to be fixed, enhances the overall performance of the aircraft.

In this regard, it may be noted that there are other conceivable options for the installation of mobile flaps 44, without departing from the scope of the disclosure herein. For example, there could be a single mobile flap situated between the two beams 40a, 40b, when viewed from above, and covering the intermediate structure 42. Whatever the case may be, these mobile flaps are designed to be in addition to the mobile flaps already present on the other sections of the leading edge 30 of the wing.

Figure 2:
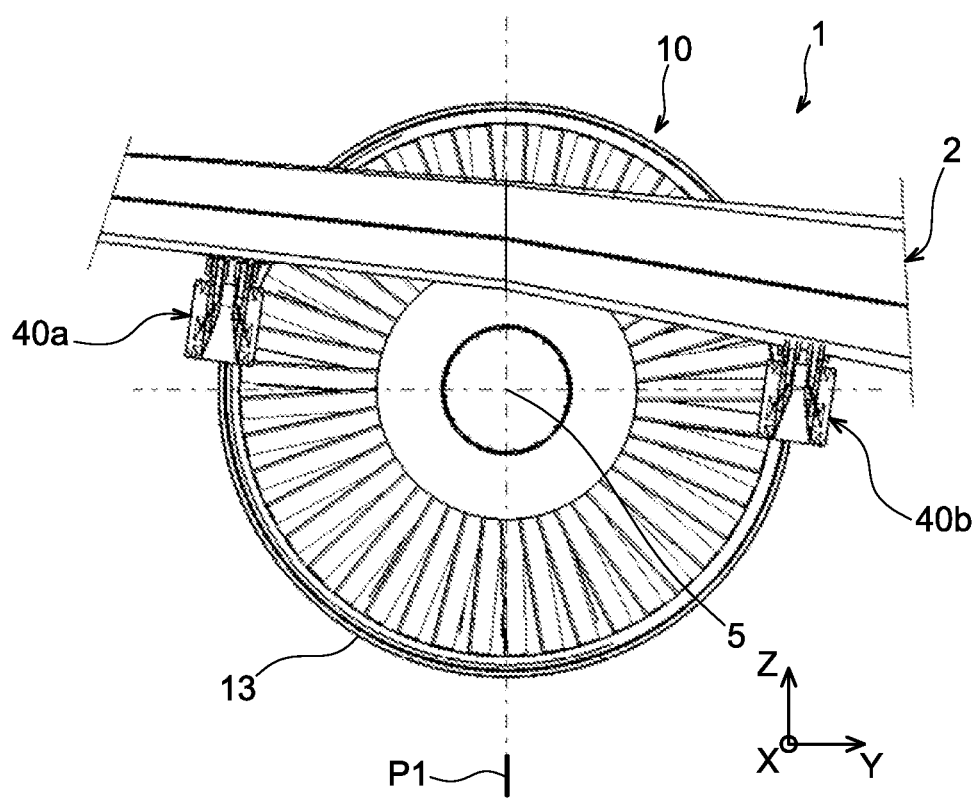
FIG. 2 depicts a rear view of the assembly shown in FIG. 1.
Figure 3:
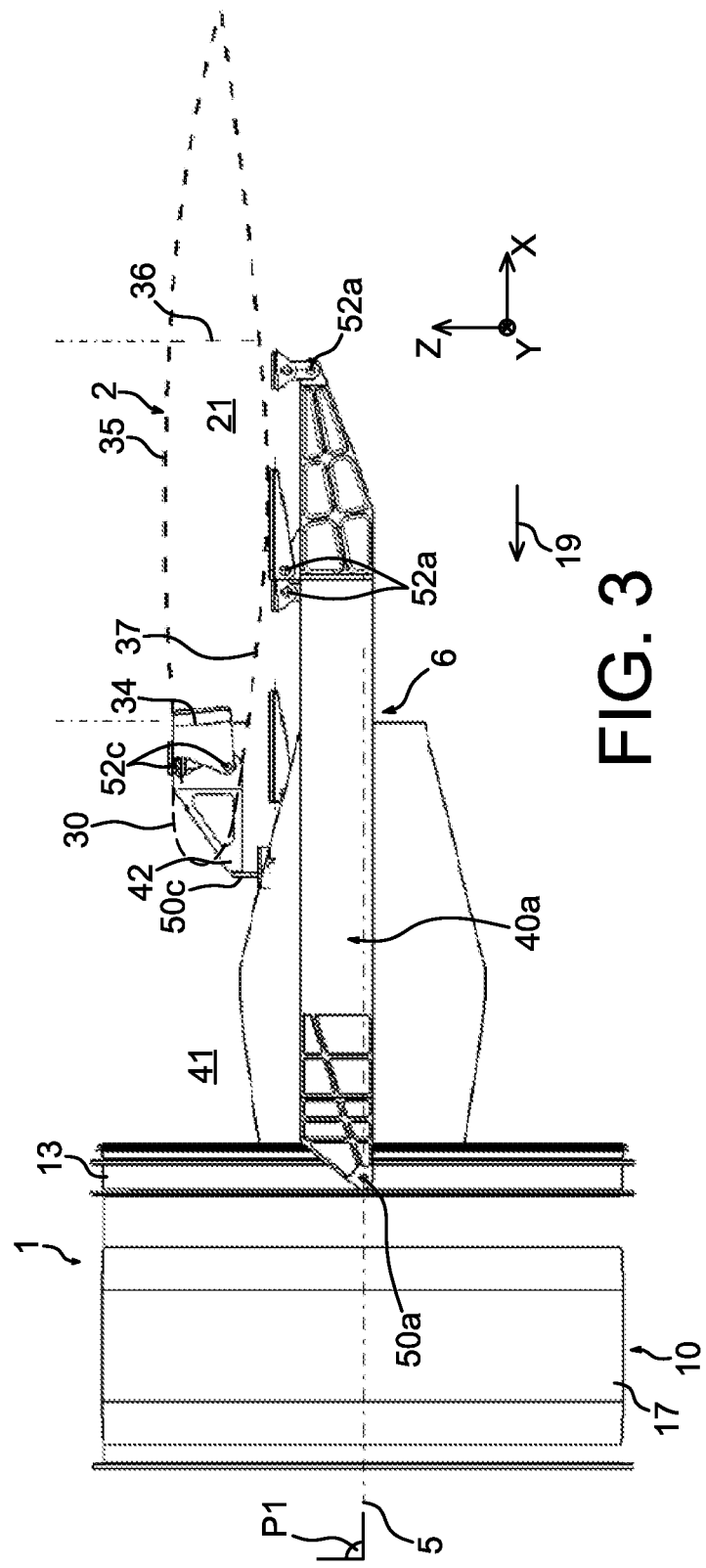
FIG. 3 depicts a side view of the assembly shown in FIG. 1.
Figure 4:
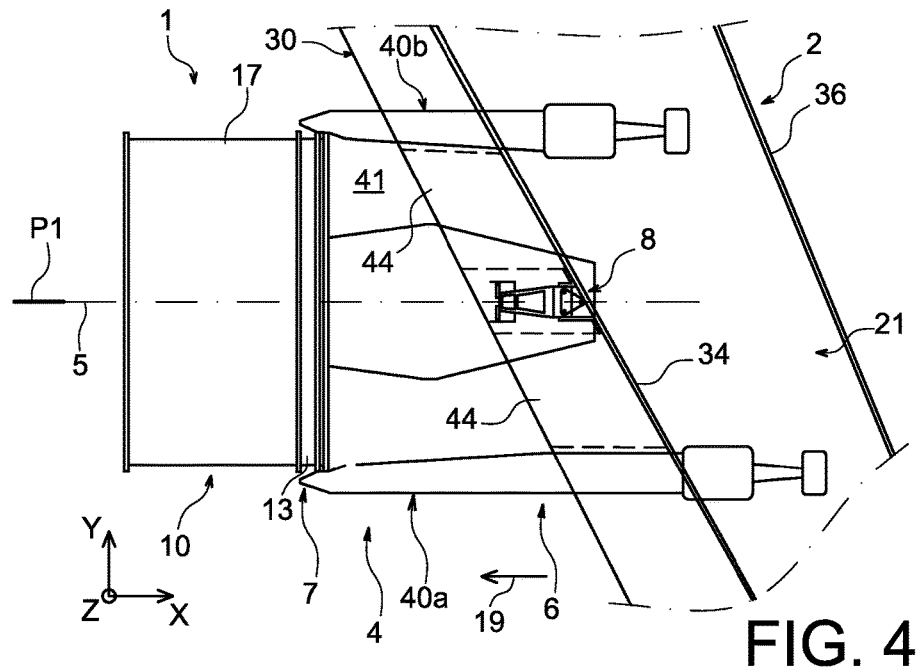
FIG. 4 depicts a view from above of the assembly shown in FIG. 1.

Reference is made to FIGS. 1 to 3 which depict the attachment structure 7 for attaching the primary structure 6 to the engine. The attachment structure 7 comprises first of all one or more first engine mounts 50a connecting a front end of the first beam 40a to the fan casing 17. More specifically, there is a single first engine attachment 50a connected on the one hand to the front end of the beam 40a and on the other hand to an external shell ring 13 of an intermediate casing of the turbojet engine 10. This shell ring 13 extends in the axial continuation of the fan casing 17, rearwards, with substantially the same diameter.

This mount 50a, just like all the other engine mounts and wing mounts, is produced in the conventional way, namely using fittings, link rods, shackles, bolts, etc. In this instance, the mount 50a is designed to react only loads directed in the directions X and Z, the reaction of loads in this latter direction Z being essentially linked to the inherent mass of the engine. In this regard, it is noted that in FIG. 1, the arrows schematically indicate the reaction of loads by the various mounts.

Similarly, the attachment structure 7 comprise one or more second engine mounts 50b connecting a front end of the second beam 40b to the shell ring 13. More specifically, there is a single second engine mount 50b designed to react loads oriented in all three directions X, Y and Z.

Finally, the attachment structure 7 comprises one or more third engine mounts 50c connecting a front end of the intermediate structure 42 to the turbine casing 25, on an upper end thereof. For preference, the mount 50c is designed so that it reacts only loads oriented in the direction Z.

The attachment structure 7 is only made up of the three engine mounts 50a, 50b, 50c which together form a load-reacting statically determinate system. Thanks to these three load-reacting statically determinate points arranged in two distinct planes offset from one another in the X direction, the operations of fitting/removing the engine become easier and engine deformations are reduced, thus enhancing the overall performance of the engine.

The attachment structure 8 for attaching the primary structure 6 to the wing box 21 first of all comprises one or more first wing mounts 52a connecting a rear end of the first beam 40a to the pressure-face part 37 of the wing box 21. More specifically, there are three first wing mounts 52a, together constituting a load-reacting independent statically determinate system. For example, two lateral wing mounts 52a are designed respectively to react loads oriented only in the directions X and Z and to react loads oriented in all three directions X, Y and Z. Again fixed to the pressure-face part 37, a first rear wing mount 52a supplements the other two, being designed to react loads only in this last direction Z.

Similarly, the attachment structure 8 comprises one or more second wing mounts 52b connecting a rear end of the second beam 40b to the pressure-face part 37 of the wing box 21. More specifically, there are three second wing mounts 52b likewise constituting a load-reacting independent statically determinate system.

Finally, the attachment structure 8 comprises one or more third wing mounts 52c connecting a rear end of the intermediate structure 42 to the front spar 34 of the wing box 21. More specifically, there may also be three third wing mounts 52c together constituting a load-reacting independent statically determinate system and preferably housed in the leading edge 30 in line with the front spar 34. Again, the three load-reacting statically determinate systems mentioned hereinabove are clearly independent of one another.

The attachment structure 8 are only made up of the aforementioned wing mounts 52a, 52b, 52c.

By having a load-reacting statically determinate system at the interfaces between the wing 2 and each of the three independent elements 40a, 40b, 42 of the primary structure 6, the disclosure herein satisfactorily handles all loading scenarios likely to occur. In particular, attachment to the wing proves satisfactory even in the event of vibrations, for example caused by the loss of a blade, a hard landing or gusting cross-winds.

Figure 5:
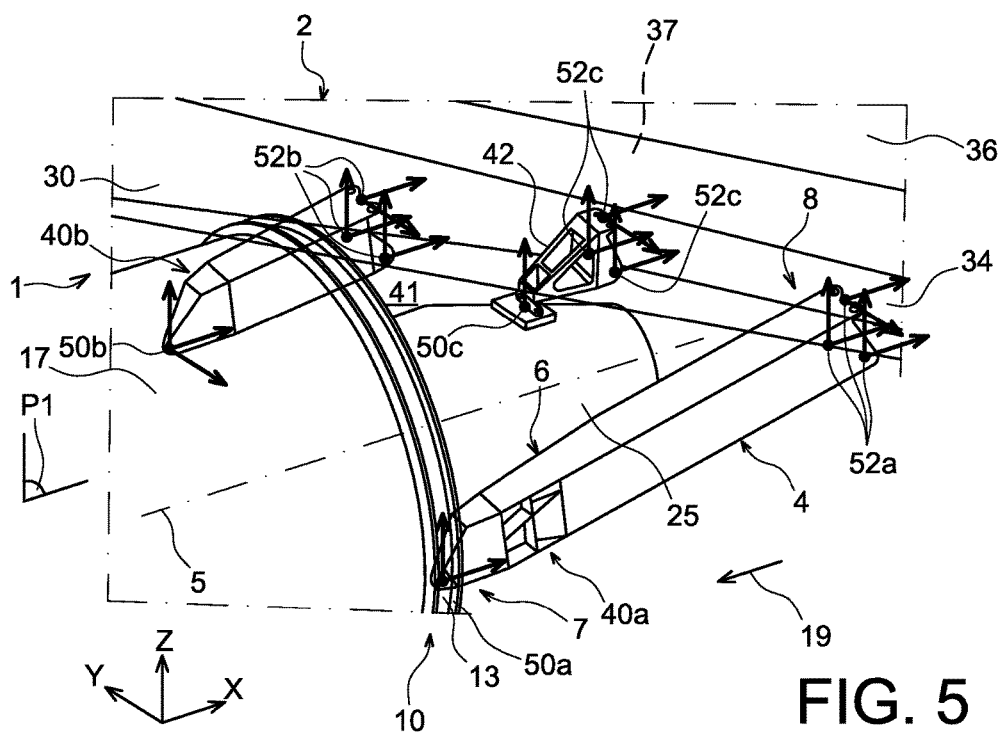
FIG. 5 depicts a perspective view similar to that of FIG. 1, with the assembly taking the form of a second preferred embodiment.

FIG. 5 depicts an assembly 1 according to a second preferred embodiment, which differs from the first embodiment only in that the rear end of the three independent elements 40a, 40b, 42 of the primary structure 6 are no longer connected under the wing box 21 but are fixed to the front part thereof, to the wing front spar 34. The aforementioned wing mounts 52a, 52b, 52c are thus preferably arranged in the leading edge 30 of the wing.

In addition, in this second embodiment, loads and moments at the wing-engine interfaces are reacted in exactly the same way as in the first preferred embodiment.

Of course, various modifications can be made by the person skilled in the art to the aircraft assemblies 1 that have just been described solely by way of nonlimiting examples.

While at least one exemplary embodiment of the disclosure herein(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft comprising a wing element, a bypass engine and an engine attachment pylon, the engine comprising a rear part arranged under the wing element equipped with a wing box, the pylon comprising a primary structure for transmitting loads from the engine to the wing box, and the assembly further comprising attachment structure for attaching the primary structure to the engine and attachment structure for attaching the primary structure to the wing box, wherein the primary structure is made up of the following unconnected elements:

a first and a second side beam arranged one on each side of a vertical mid-plane of the engine; and an intermediate structure through which the vertical mid-plane of the engine passes and which is situated some distance from each of the first and second side beams, wherein the unconnected elements each provide independent load paths between the engine and the wing element.

2. The assembly for an aircraft according to claim 1, wherein the attachment structure for attaching the primary structure to the engine comprises:

one or more first engine mounts connecting a front end of the first beam to a fan casing of the engine;

one or more second engine mounts connecting a front end of the second beam to the fan casing; and one or more third engine mounts connecting the intermediate structure to a central casing of the engine, and wherein the attachment structure for attaching the primary structure to the wing box comprises:

one or more first wing mounts connecting a rear end of the first beam to the wing box;

one or more second wing mounts connecting a rear end of the second beam to the wing box; and one or more third wing mounts connecting the intermediate structure to the wing box.

3. The assembly for an aircraft according to claim 2, wherein:

the first wing mount or mounts constitute an independent load-reacting statically determinate system;

the second wing mount or mounts constitute a load-reacting independent statically determinate system;

the third wing mount or mounts constitute a load-reacting independent statically determinate system; and the first engine mount or mounts, the second engine mount or mounts and the third engine mount or mounts together constitute a load-reacting statically determinate system.

4. The assembly for an aircraft according to claim 1, wherein the first and second side beams are arranged substantially symmetrically with respect to the vertical mid-plane, having, passing through them, a plane substantially perpendicular to this same vertical mid-plane and passing diametrically through the engine, the first and second side beams being substantially aligned with an external surface of the fan casing in the longitudinal direction of the engine.

5. The assembly for an aircraft according to claim 1, wherein the intermediate structure has a length, in the longitudinal direction of the engine, between three and ten times smaller than that of each of the first and second side beams.

6. The assembly for an aircraft according to claim 1, wherein the intermediate structure takes the form of a fitting, preferably in the overall shape of a pyramid.

7. The assembly for an aircraft according to claim 2, wherein the third engine mount or mounts are connected to a turbine casing of the engine.

8. The assembly for an aircraft according to claim 1, wherein the first and second side beams run substantially parallel to a longitudinal axis of the engine.

9. The assembly for an aircraft according to claim 1, wherein the wing element comprises at least one mobile leading-edge flap arranged at least in part between the intermediate structure and one of the first and second side beams.

10. An aircraft comprising at least one assembly according to claim 1.

* * * * *